(12) United States Patent
Aguirre et al.

(10) Patent No.: US 9,090,209 B2
(45) Date of Patent: Jul. 28, 2015

(54) INTEGRATED UNDERSEAT STORAGE

(75) Inventors: Adrian Aguirre, Xochimilco (MX);
Pedro Antonio Romero Oceguera,
Xochimilco (MX); Alberto Soto Marin,
Xochimilco (MX)

(73) Assignee: Ford Global Technologies, LLC,
Dearborn, MI (US)

( * ) Notice: Subject to any disclaimer, the term of this patent is extended or adjusted under 35 U.S.C. 154(b) by 321 days.

(21) Appl. No.: 13/479,331

(22) Filed: May 24, 2012

(65) Prior Publication Data

US 2013/0313869 A1 Nov. 28, 2013

(51) Int. Cl.
*B60N 2/44* (2006.01)
*B60N 2/02* (2006.01)
*B60R 7/04* (2006.01)
*B60N 3/00* (2006.01)
*B60N 2/30* (2006.01)

(52) U.S. Cl.
CPC ............... *B60R 7/043* (2013.01); *B60N 2/305* (2013.01); *B60N 3/00* (2013.01)

(58) Field of Classification Search
CPC ...... B60N 3/101; B60N 3/3047; B60N 2/305; B60N 3/00; B60R 7/043; B60R 2011/0012; A01K 97/22
USPC ...................................................... 297/188.1
See application file for complete search history.

(56) References Cited

U.S. PATENT DOCUMENTS

| | | | |
|---|---|---|---|
| 3,213,467 A * | 10/1965 | Hubbard | 4/478 |
| 5,820,210 A * | 10/1998 | Shipman et al. | 297/188.01 |
| 5,902,009 A * | 5/1999 | Singh et al. | 297/188.1 |
| 5,957,521 A | 9/1999 | Schlachter | |
| 6,102,463 A * | 8/2000 | Swanson et al. | 296/37.15 |
| 6,106,044 A | 8/2000 | Schlachter | |
| 6,161,896 A * | 12/2000 | Johnson et al. | 297/188.1 |
| 6,390,547 B1 * | 5/2002 | Spykerman | 297/188.1 |
| 6,488,327 B1 * | 12/2002 | Pearse et al. | 296/65.05 |
| 6,626,478 B1 | 9/2003 | Minton | |
| 6,877,807 B2 * | 4/2005 | Mizuno et al. | 297/188.1 |
| 7,121,606 B2 * | 10/2006 | Khan et al. | 296/37.15 |
| 7,300,088 B1 | 11/2007 | Catenacci et al. | |
| 7,517,014 B2 * | 4/2009 | Schroeder et al. | 297/188.09 |
| 7,523,985 B2 * | 4/2009 | Bhatia et al. | 297/188.04 |
| 7,530,631 B2 | 5/2009 | Skelly et al. | |
| 7,780,229 B2 | 8/2010 | Verhee | |
| 7,819,468 B2 * | 10/2010 | Tsuda et al. | 297/188.1 |
| 2006/0099057 A1 | 5/2006 | Fair | |
| 2006/0103186 A1 | 5/2006 | Sturt et al. | |

* cited by examiner

*Primary Examiner* — David R Dunn
*Assistant Examiner* — Tania Abraham
(74) *Attorney, Agent, or Firm* — Vichit Chea; Price Heneveld LLP

(57) ABSTRACT

A seating assembly for a vehicle including a seat movable between a raised vertical position and a lowered horizontal position. A storage cavity is defined by an underside of the seat. The storage cavity includes a plurality of vehicle emergency items. Retaining features are disposed on the underside of the seat and secure the plurality of vehicle emergency items. An access opening is disposed on the underside of the seat. A door covers the access opening and is pivotally connected to the underside of the seat. The door is maintained in a latched condition until the seat is moved to the raised vertical position. The door moves to an unlatched condition when the seat is in the raised vertical position and access to the access opening is possible.

14 Claims, 6 Drawing Sheets

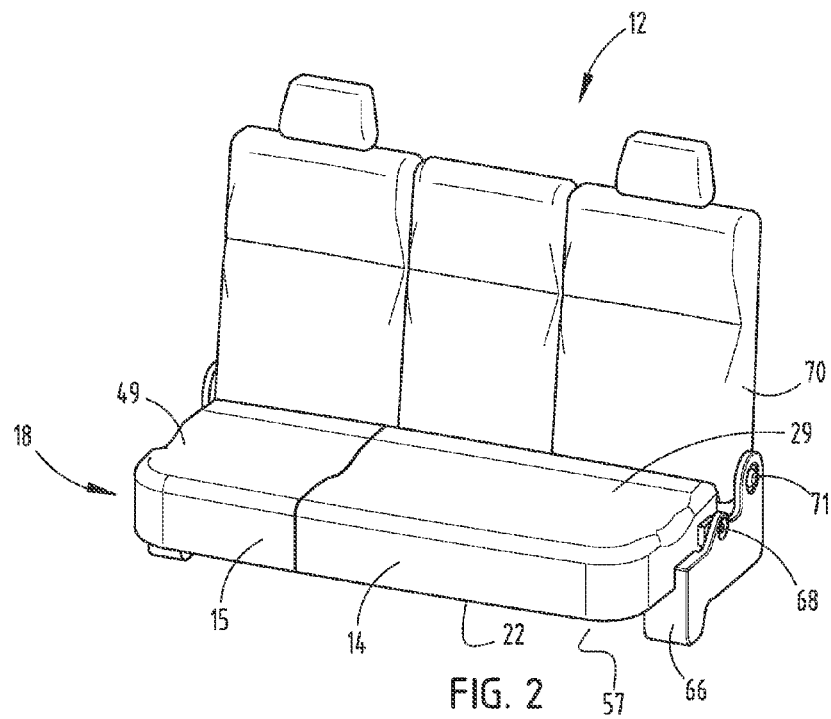
FIG. 2
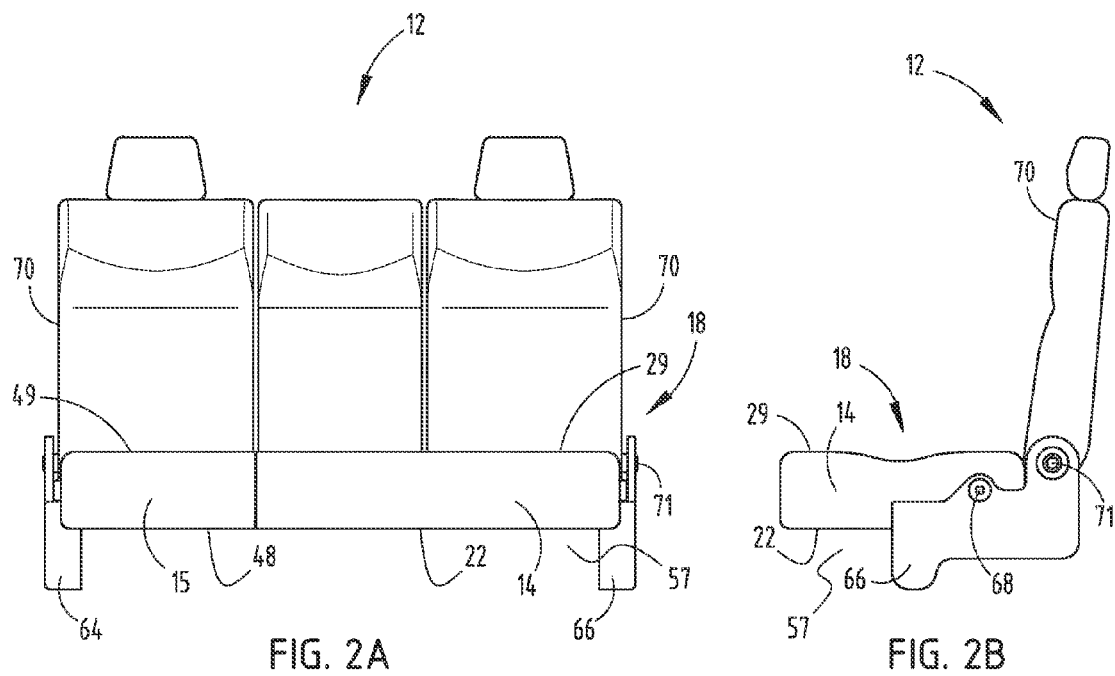
FIG. 2A
FIG. 2B

INTEGRATED UNDERSEAT STORAGE

FIELD OF THE INVENTION

The present invention generally relates to an integrated underseat storage system, and more specifically to an integrated underseat storage system for a seating assembly.

BACKGROUND OF THE INVENTION

Vehicles generally have storage features so that transported items can be positioned in a safe place. Storage features that take advantage of otherwise unused space are very useful.

SUMMARY OF THE INVENTION

According to one aspect of the present invention, a seating assembly for a vehicle includes a seat movable between a raised vertical position and a lowered horizontal position. A storage cavity is defined by an underside of the seat. The storage cavity includes a plurality of vehicle emergency items. Retaining features are disposed on the underside of the seat and secure the plurality of vehicle emergency items. An access opening is disposed on the underside of the seat. A door covers the access opening and is pivotally connected to the underside of the seat. The door is maintained in a latched condition until the seat is moved to the raised vertical position. The door moves to an unlatched condition when the seat is in the raised vertical position and access to the access opening is possible.

According to another aspect of the present invention, a seating assembly for a vehicle includes a seat back. A seat is pivotally coupled with the seat back and is movable between a raised position and a lowered position. The seat defines a storage cavity. A single access opening is disposed on an underside of the seat. A door covers the access opening. Access to the storage cavity through the access opening is possible only when the seat is in the raised position.

According to yet another aspect of the present invention, a seating assembly for a vehicle includes a seat movable between a raised position and a lowered position. An underside of the seat defines a storage cavity. An access opening is disposed on the underside of the seat. A door covers the access opening and is operable between a latched condition and an unlatched condition. The door is movable to the unlatched condition only when the seat is in the raised position.

Still another aspect of the present invention includes a seating assembly that has a storage feature that takes advantage of otherwise unused space in the seating assembly. The storage feature can be used to store a variety of items, including emergency tools. The storage feature is located in the seating assembly and is generally accessible when the seat is rotated to a substantially vertical position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a top perspective view of the seating assembly of FIG. 1;

FIG. 2A is a front elevational view of the seating assembly of FIG. 1;

FIG. 2B is a side elevational view of the seating assembly of FIG. 1 with a seat in a lowered position;

DETAILED DESCRIPTION OF THE EMBODIMENTS

Figure 1:
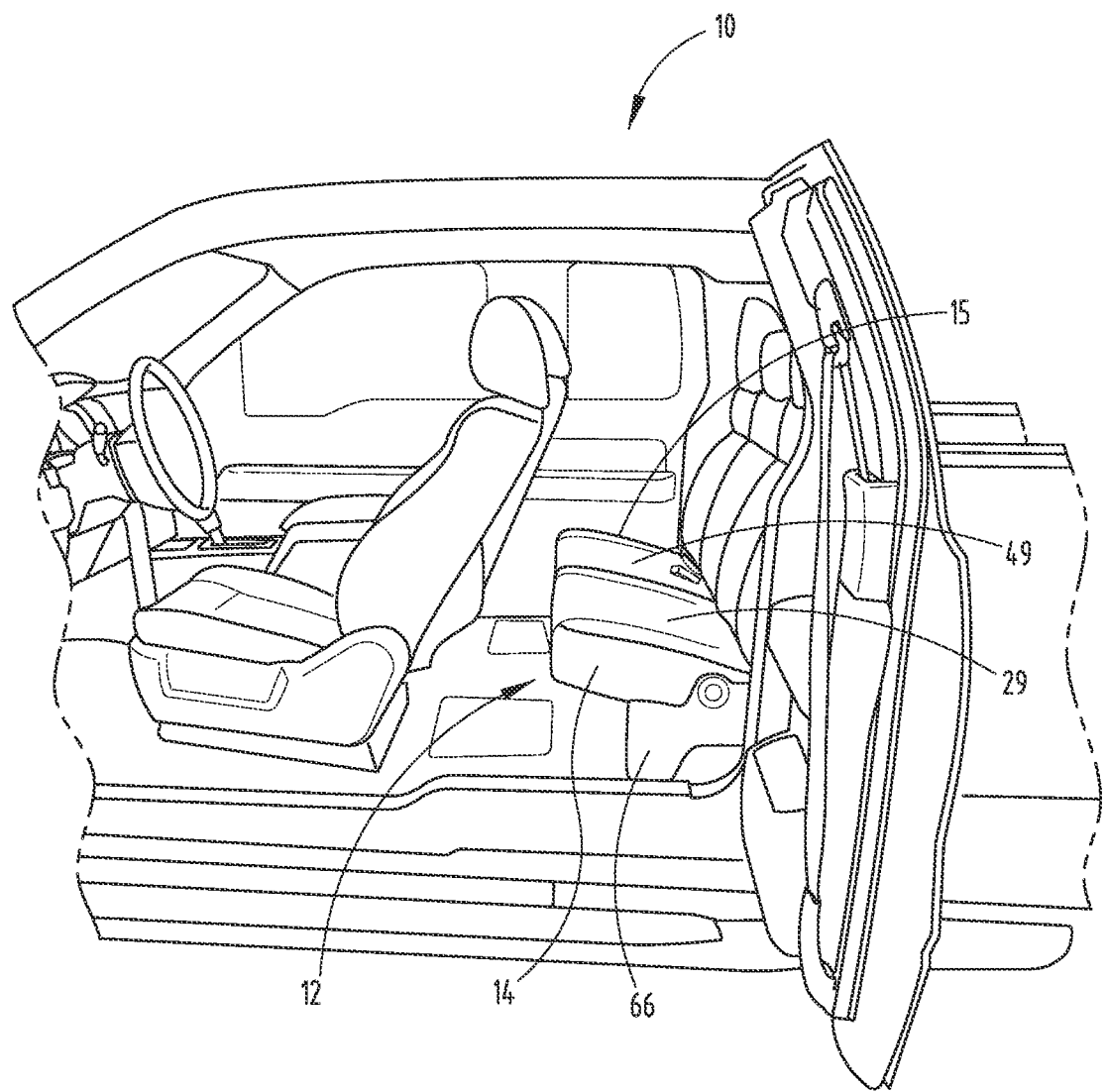
FIG. 1 is a side perspective view of one embodiment of a seating assembly for a vehicle incorporating an underseat storage feature of the present invention.

For purposes of description herein, the terms "upper," "lower," "right," "left," "rear," "front," "vertical," "horizontal," "inboard," "outboard," and derivatives thereof shall relate to the fastener as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5B, reference numeral 10 generally designates a vehicle having a seating assembly 12 of the present invention. The seating assembly 12 includes first and second seats 14, 15 that are each movable between a raised vertical position 16 and a lowered horizontal position 18. A storage cavity 20 is defined by an underside 22 of the seat 14. The storage cavity 20 includes a plurality of vehicle emergency items 24 and at least one shelf 25. Underseat retaining features 26 are disposed on the underside 22 of the seat 14 and secure the plurality of vehicle emergency items 24. An access opening 28 is disposed on the underside 22 of the seat 14. A door 30 covers the access opening 28 and is pivotally connected to the underside 22 of the seat 14 below a seat cushion 29. The door 30 is maintained in a latched condition until the seat 14 is moved to the raised vertical position 16. The door 30 moves to an unlatched condition when the seat 14 is in the raised vertical position 16, such that items in the access opening 28 are available.

As illustrated in FIGS. 1-5B, the seat 15 of the seating assembly 12 is also movable between the raised vertical position 16 and the lowered horizontal position 18. A storage cavity 46 is defined in an underside 48 of the seat 15 below a seat cushion 49. The storage cavity 46 includes the plurality of vehicle emergency items 24. The retaining features 26 are also disposed on the underside 48 of the seat 15 and secure the plurality of vehicle emergency items 24 thereto. The underside 48 of the seat 15 also includes an access opening 50 that covers the storage cavity 46. A door 52 covers the access opening 50 and is in a latched condition when the seat 15 is in the lowered horizontal position 18. An actuation assembly 53 disposed on the door 15 maintains the door 52 in the latched condition until the seat 15 is moved to the raised vertical position 16. The actuation assembly 53 moves to an unlatched condition when the seat 15 is in the raised vertical position 16, such that items in the access opening 50 are generally available. The actuation assembly 53 is adapted for connection with a receiver 55 on the seats 14, 15. It is also contemplated that the actuation assembly 53 could be disposed on the seats 14, 15 and the receiver 55 could be located on the seats 14, 15. As illustrated, the seat 15 is smaller than the seat 14, but otherwise has features similar to those of seat 14.

The doors 30, 52 may be substantially coplanar with the access openings 28, 50, or may be positioned below the access openings 28, 50 for increased storage space. Alternatively, the door 30 may be recessed into the underside 22 of the seat 14 and the underside 48 of the seat 15. This construction limits the storage space available in the storage cavities 20, 46, but is capable of hiding the doors 30, 52 from view when the seats 14, 15 are in the lowered horizontal position 18. Notably, the door 30 of the seat 14 can be opened and closed independently of the door 52 of the seat 15. An additional storage space 57 may be disposed below the seats 14, 15. The additional storage space 57 may be bound or unbound. More specifically, the storage space 57 may include deployable walls capable of holding items in the storage space 57.

As illustrated in FIG. 1, the seating assembly 12 of the present invention is generally designed for use as a rear seating assembly 12 of a pickup truck. However, it is contemplated that the seating assembly 12 may be used in any of a variety of vehicles. Additionally, it is contemplated that the seating assembly 12 may be used with various split-seat configurations, including 50/50 seating arrangements, 40/60 seating arrangements, etc. As previously noted, the seats 14, 15 in the seating assembly 12 are designed for movement between the raised vertical position 16 and the lowered horizontal position 18 by a user. The seating assembly 12 is available to support a user in a seated condition when the seats 14, 15 are in the lowered horizontal position 18. When the seat 14 of the seating assembly 12 is in the raised vertical position 16, the seating assembly 12 is available to receive items to be stored in the storage cavity 20 of the seat 14. Similarly, when the seat 15 is in the raised vertical position 16, items can be stored in the storage cavity 46 of the seat 15. It is contemplated that the user may move the seat 14 between the raised vertical position 16 and the lowered horizontal position 18 manually, or by an automated system, as understood by one having ordinary skill in the art.

Referring again to FIGS. 1-2B, in the illustrated embodiment, the seating assembly 12 is hingedly connected to and supported on first and second side supports 64, 66 at a first pivot connection 68 at a second pivot connection 71. A seatback 70 is also rotatably coupled with the first and second side supports 64, 66. The first and second side supports 64, 66 are fixedly attached to the vehicle 10 and support the seating assembly 12 in a position above a floor of the vehicle 10. The incline of the seats 14, 15 and the seat back 70 may be adjusted manually, or may be an automated recliner system, as known in the art.

Figure 3:
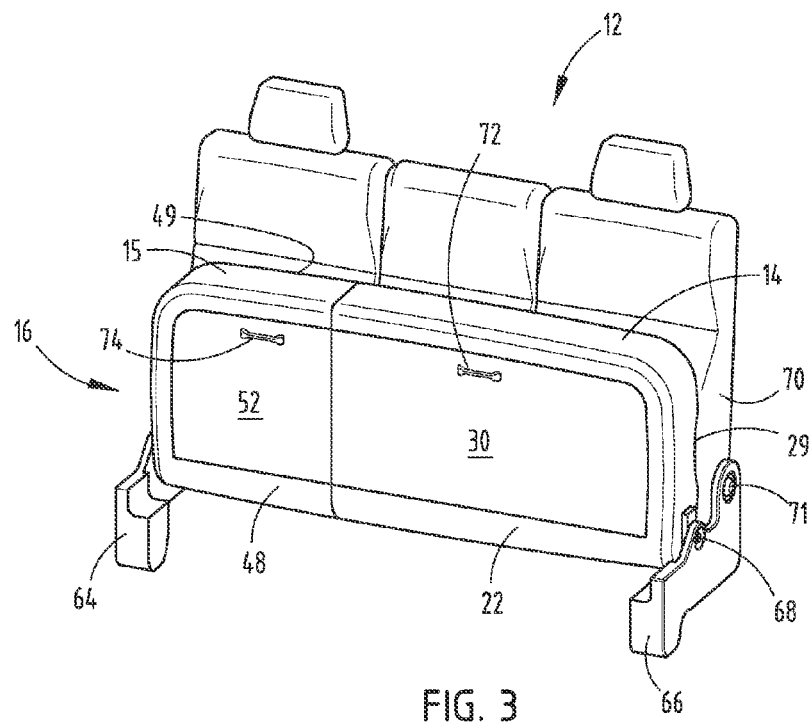
FIG. 3 is a top perspective view of another embodiment of a seating assembly of the present invention.
Figure 3A:
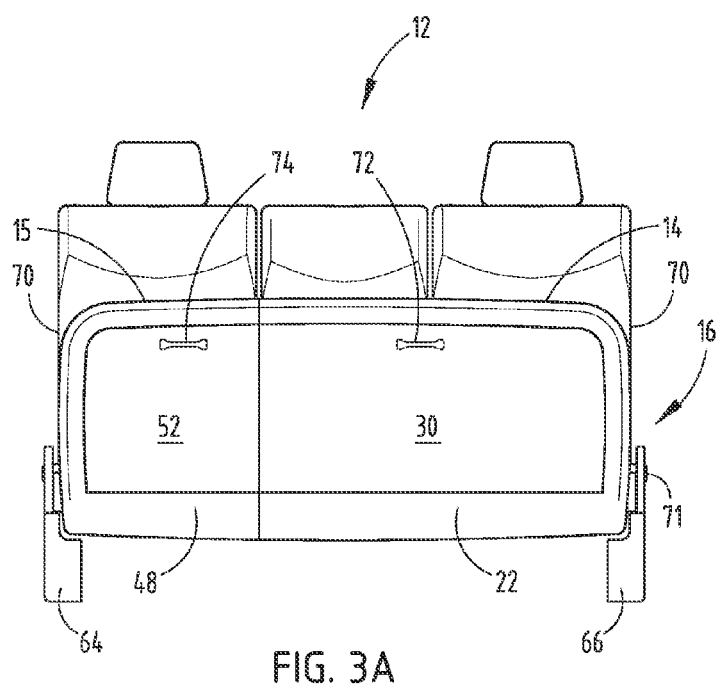
FIG. 3A is a front elevational view of the seating assembly of FIG. 3 with the seat in the raised position.
Figure 3B:
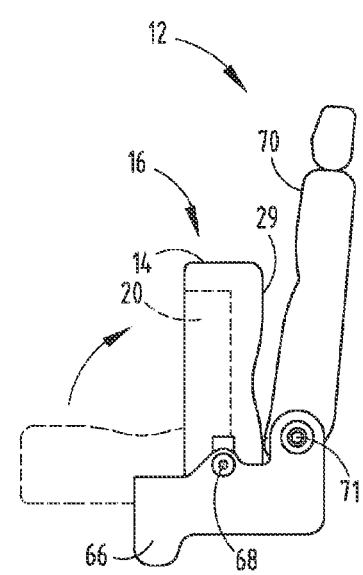
FIG. 3B is a side elevational view of the seating assembly of FIG. 3 with the seat in the raised position.

As illustrated in FIGS. 3-3B, the door 30 is disposed on the underside 22 of the seat 14 and includes a handle 72 adapted to assist a user in moving the door 30 between an open position and a closed position. It is contemplated that the door 30 may be connected with the underside 22 of the seat 14 in a variety of arrangements, including a hinge disposed about a bottom portion of the door 30, which may be a living hinge or a piano-type hinge. Alternatively, the door 30 may be completely removable from the underside 22 of the seat 14. Similarly, the door 52 includes a handle 74 that is configured to assist a user in moving the door 52 from an open position to a closed position.

Figure 4:
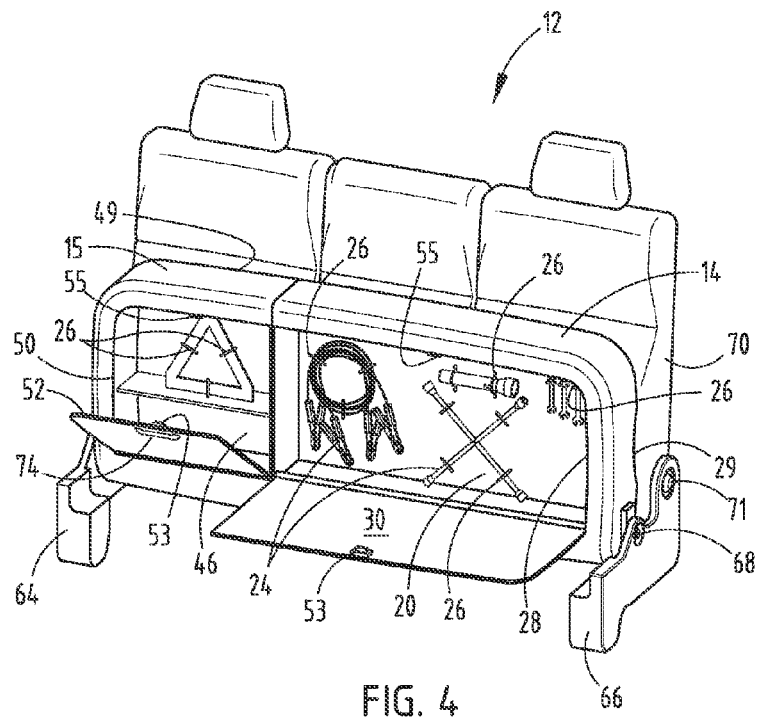
FIG. 4 is a top perspective view of another embodiment of a seating assembly of the present invention.
Figure 4A:
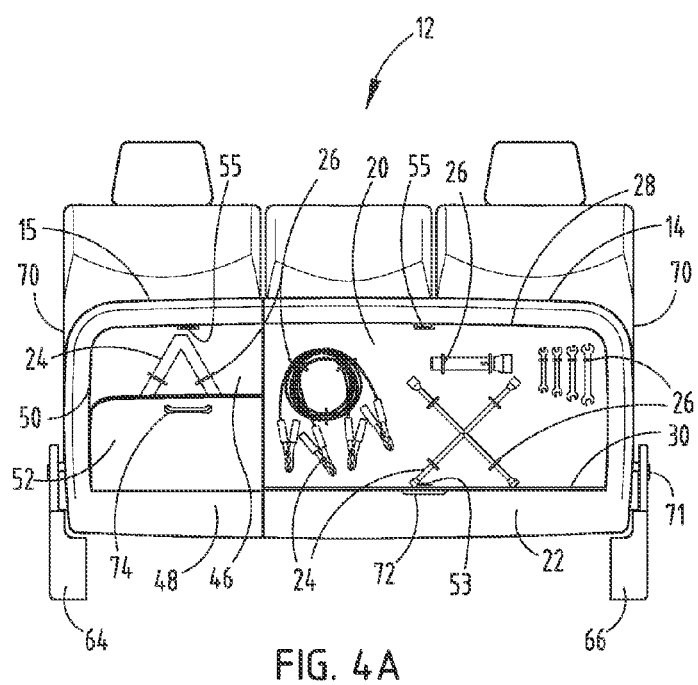
FIG. 4A is a front elevational view of the seating assembly of FIG. 3 with the seat in the raised position and the storage cavity open.
Figure 4B:
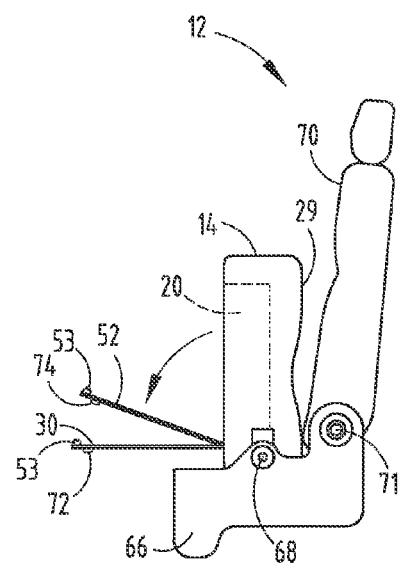
FIG. 4B is a side elevational view of the seating assembly of FIG. 1 with the seat in the raised position and the storage cavity open.
Figure 4C:
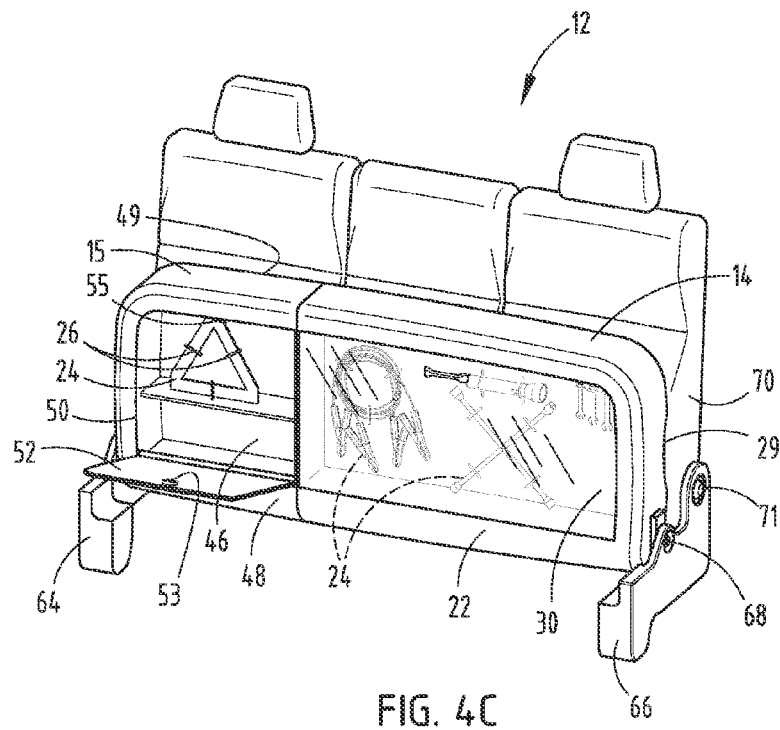
FIG. 4C is a top perspective view of the seating assembly of FIG. 1 with the seat in the raised position and one of the storage cavities closed.
Figure 4D:
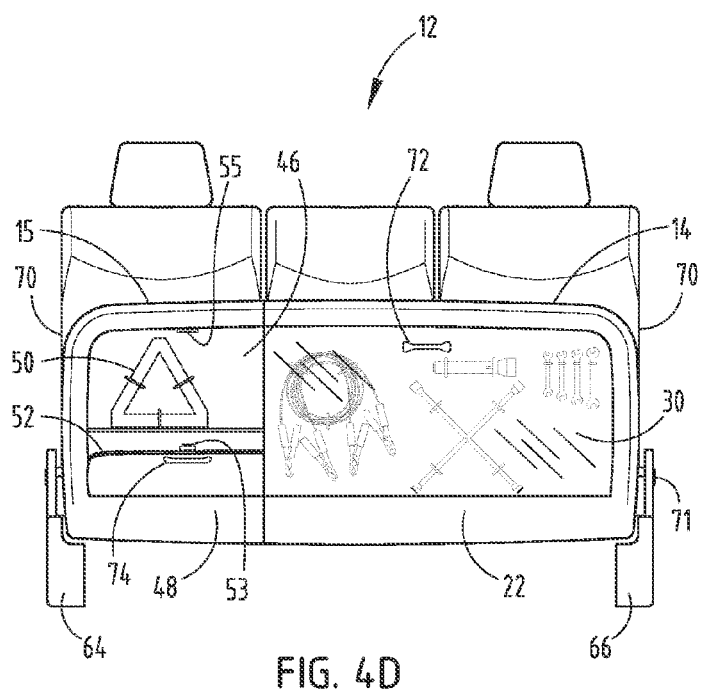
FIG. 4D is a front elevational view of the seating assembly of FIG. 1 with the seat in the raised position and one of the storage cavities closed.
Figure 4E:
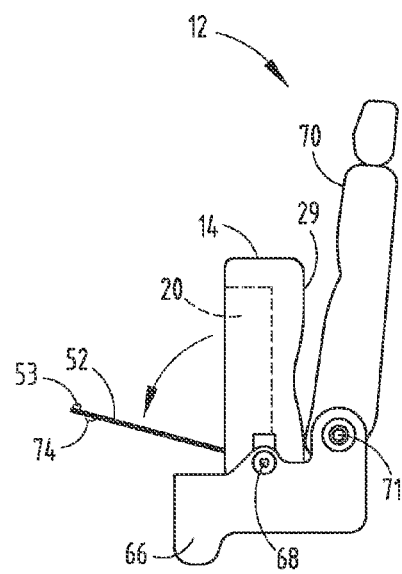
FIG. 4E is a side elevational view of the seating assembly of FIG. 1 with the seat in the raised position and one of the storage cavities closed.

As shown in FIGS. 4-4B, a variety of items, which may be emergency items 24 for use in an emergency situation, can be stored inside the seats 14, 15. The storage cavities 20, 46 have a thickness that is less than the total thickness of the seat 14, such that the seat 14 defines a cushion and support assembly to interface with the posterior of a user. In the illustrated embodiment of FIGS. 4-4B, the doors 30, 52 may be comprised of a variety of materials, including plastic, wood, or metal. If the doors 30, 52 include a solid body construction that employs wood or metal, the storage cavities 20, 46, and items disposed therein are generally hidden from view when the doors 30, 52, respectively, are closed. If plastic is used, the plastic may be wholly or partially transparent, such that items disposed in the storage cavity 20 can be seen even when the door 30 is closed. Access to the items 24 may be limited such that the items 24 can only be obtained when the seats 14, 15 are in the raised vertical position 16. Alternatively, the doors 30, 52 may be configured to remain unlatched, regardless of whether the seats 14, 15 are in the raised vertical position 16 or the lowered horizontal position 18.

Figure 5:
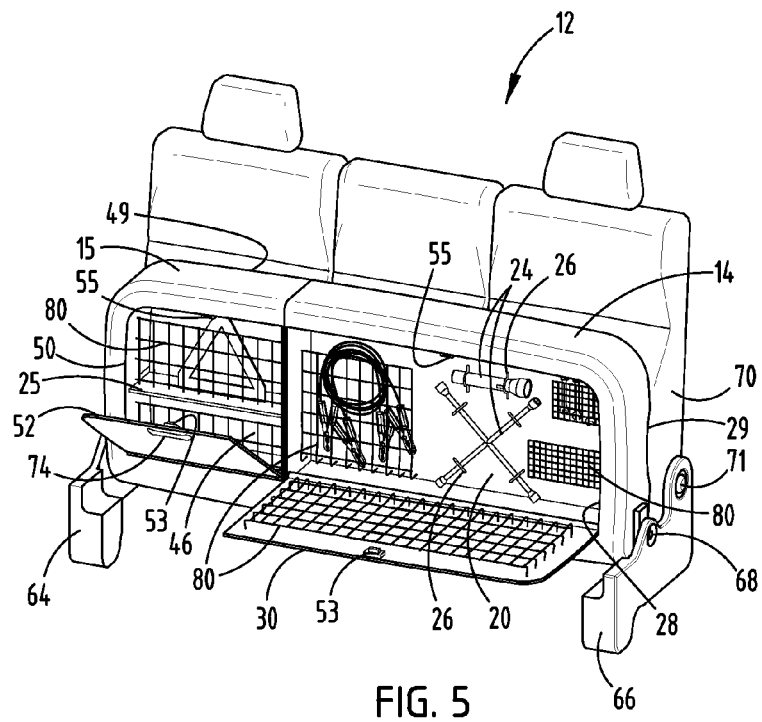
FIG. 5 is a top perspective view of another embodiment of a seating assembly with a seat in a raised position and a storage cavity open.
Figure 5A:
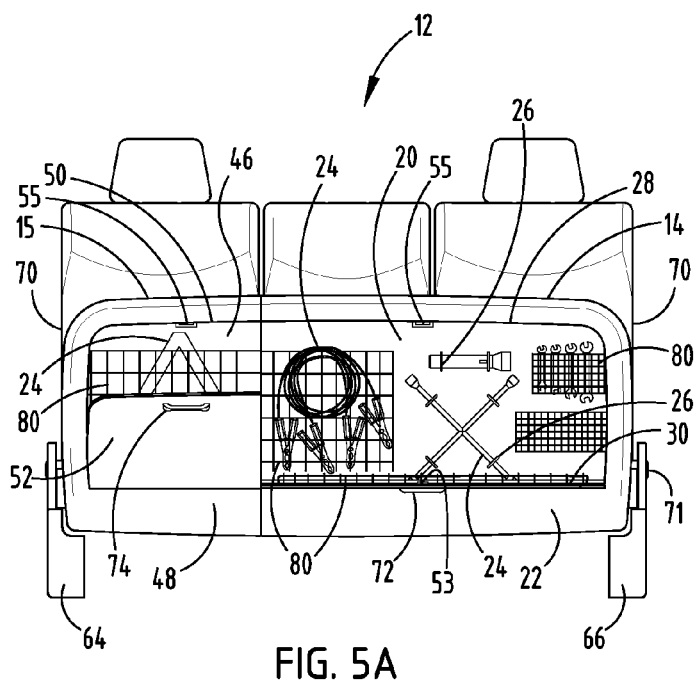
FIG. 5A is a front elevational view of the seating assembly of FIG. 5 with the seat in the raised position and the storage cavity open.
Figure 5B:
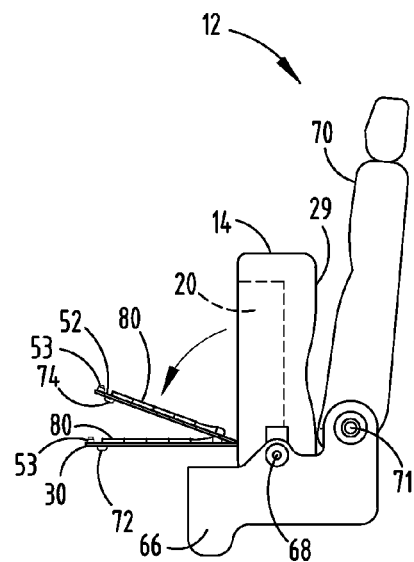
FIG. 5B is a side elevational view of the seating assembly of FIG. 5 with the seat in the raised position and the storage cavity open.

Referring now to FIGS. 5-5B, another embodiment of the present invention includes a variety of netting members 80 designed to elastically secure various items inside the storage cavity 20. The netting members 80 have a flexible construction that holds the items against the underside 22 of the seat 14, such that the items do not rattle as the vehicle 10 is traveling. Additionally, netting members 80 may be disposed on an inside portion of the door 30, such that items secured with the door 30 also do not rattle.

One method of accessing items 24 stored in the seats 14, 15 includes raising one or both of the seats 14, 15 to the raised vertical position 16 from the lowered horizontal position 18. The actuation assembly 53 is disengaged such that one or both of the doors 30, 52 may be opened by a user. The user opens one or both of the doors 30, 52 and retrieves items 24 that are held in place by the retaining features 26 on one of the undersides 22, 48 of one or both of the seats 14, 15. One or both of the doors 30, 52 are then closed and one or both of the seats 14, 15 are moved back to the lowered horizontal position 18 from the raised vertical position 16.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly for a vehicle comprising:
a seat movable between a raised vertical position and a lowered horizontal position;
a storage cavity defined by an underside of the seat, the storage cavity including a plurality of vehicle emergency items and at least one shelf;
underseat retaining features disposed on the underside of the seat and securing the plurality of vehicle emergency items;
an access opening disposed on the underside of the seat;
a door covering the access opening and pivotally connected to the underside of the seat, wherein the door is maintained in a latched condition until the seat is moved to the raised vertical position, and wherein the door moves to an unlatched condition when the seat is in the raised vertical position and access to the access opening is possible; and
item retaining features disposed on the door.

2. The seating assembly of claim 1, further comprising:
an actuation assembly coupled to the door and adapted to shift the door from the latched condition to the unlatched condition when the seat is in the raised vertical position.

3. The seating assembly of claim 1, further comprising:
a handle assembly disposed on an exterior side of the door.

4. The seating assembly of claim 1, further comprising:
a storage space disposed below the seat when the seat is in the lowered horizontal position.

5. The seating assembly of claim 1, wherein the door includes an at least partially transparent body construction such that items in the storage cavity can be viewed when the door is in a closed position.

6. The seating assembly of claim 1, wherein the door includes a solid body construction such that items in the storage cavity cannot be viewed when the door is in a closed position.

7. A seating assembly for a vehicle comprising:
a seat back;
a seat pivotally coupled with the seat back and movable between a raised position and a lowered position, the seat defining a storage cavity that includes at least one shelf;
a single access opening disposed on an underside of the seat;
a door covering the access opening, wherein access to the storage cavity through the access opening is possible only when the seat is in the raised position; and
retaining features disposed on the door and on an underside of the seat.

8. The seating assembly of claim 7, further comprising:
a handle assembly disposed on an exterior side of the door.

9. The seating assembly of claim 7, further comprising:
a storage space disposed below the seat when the seat is in the lowered position.

10. The seating assembly of claim 7, wherein the door includes a solid body construction such that items in the storage cavity cannot be viewed when the door is in a closed position.

11. A seating assembly for a vehicle comprising:
a seat movable between raised and lowered positions;
a storage cavity disposed on an underside of the seat and including at least one shelf;
a door covering the access opening and operable between latched and unlatched conditions, the door being is movable to the unlatched condition when the seat is in the raised position; and
retaining features disposed on the door and an underside of the seat.

12. The seating assembly of claim 11, further comprising:
an actuation assembly coupled to the door and adapted to shift the door from the latched condition to the unlatched condition when the seat is in the raised position.

13. The seating assembly of claim 11, further comprising:
a storage space disposed below the seat when the seat is in the lowered position.

14. The seating assembly of claim 11, wherein the door includes a solid body construction such that items in the storage cavity cannot be viewed when the door is in a closed position.

* * * * *